(12) United States Patent
McColgan et al.

(10) Patent No.: US 10,595,352 B2
(45) Date of Patent: Mar. 17, 2020

(54) ESTABLISHING A SECURE SHORT-RANGE WIRELESS COMMUNICATIONS CONNECTION AT A VEHICLE

(71) Applicant: GM GLOBAL TECHNOLOGY OPERATIONS LLC, Detroit, MI (US)

(72) Inventors: Brian E. McColgan, LaSalle (CA); Ramie Phillips, III, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 15/825,844

(22) Filed: Nov. 29, 2017

(65) Prior Publication Data
US 2019/0166635 A1   May 30, 2019

(51) Int. Cl.
| | |
|---|---|
| *H04W 76/14* | (2018.01) |
| *H04L 9/32* | (2006.01) |
| *H04L 29/06* | (2006.01) |
| *H04W 4/80* | (2018.01) |
| *H04L 9/08* | (2006.01) |

(52) U.S. Cl.
CPC ........... *H04W 76/14* (2018.02); *H04L 9/0822* (2013.01); *H04L 9/0825* (2013.01); *H04L 9/3247* (2013.01); *H04L 9/3263* (2013.01); *H04L 63/0823* (2013.01); *H04W 4/80* (2018.02); *H04M 2250/02* (2013.01); *H04M 2250/04* (2013.01)

(58) Field of Classification Search
CPC ...................................................... H04W 4/40
See application file for complete search history.

(56) References Cited

U.S. PATENT DOCUMENTS

| | | | | |
|---|---|---|---|---|
| 2004/0003252 A1* | 1/2004 | Dabbish | .................. | B60R 25/04 713/175 |
| 2008/0010458 A1* | 1/2008 | Holtzman | ........... | H04L 63/0823 713/175 |
| 2014/0270172 A1* | 9/2014 | Peirce | ................... | H04L 9/0819 380/270 |

\* cited by examiner

*Primary Examiner* — Hsinchun Liao
(74) *Attorney, Agent, or Firm* — Reising Ethington P.C.; David Willoughby

(57) ABSTRACT

A method and system of establishing a short-range wireless communications connection between a host device and a client device, wherein the host device includes a host certificate and a host key, the method including the steps of: transmitting an advertisement using a short-range wireless communications (SRWC) protocol from the host device to the client device; receiving a connection request message from the client device; receiving a client device verification message, wherein the client device verification message includes an encrypted client certificate, wherein the encrypted client certificate is a certificate that is encrypted using a client key; decrypting the encrypted certificate using the host key to obtain the client certificate; verifying the client certificate using the host certificate; generating a shared secret; encrypting the shared secret using the host key; and sending the encrypted shared secret to the client device.

6 Claims, 2 Drawing Sheets

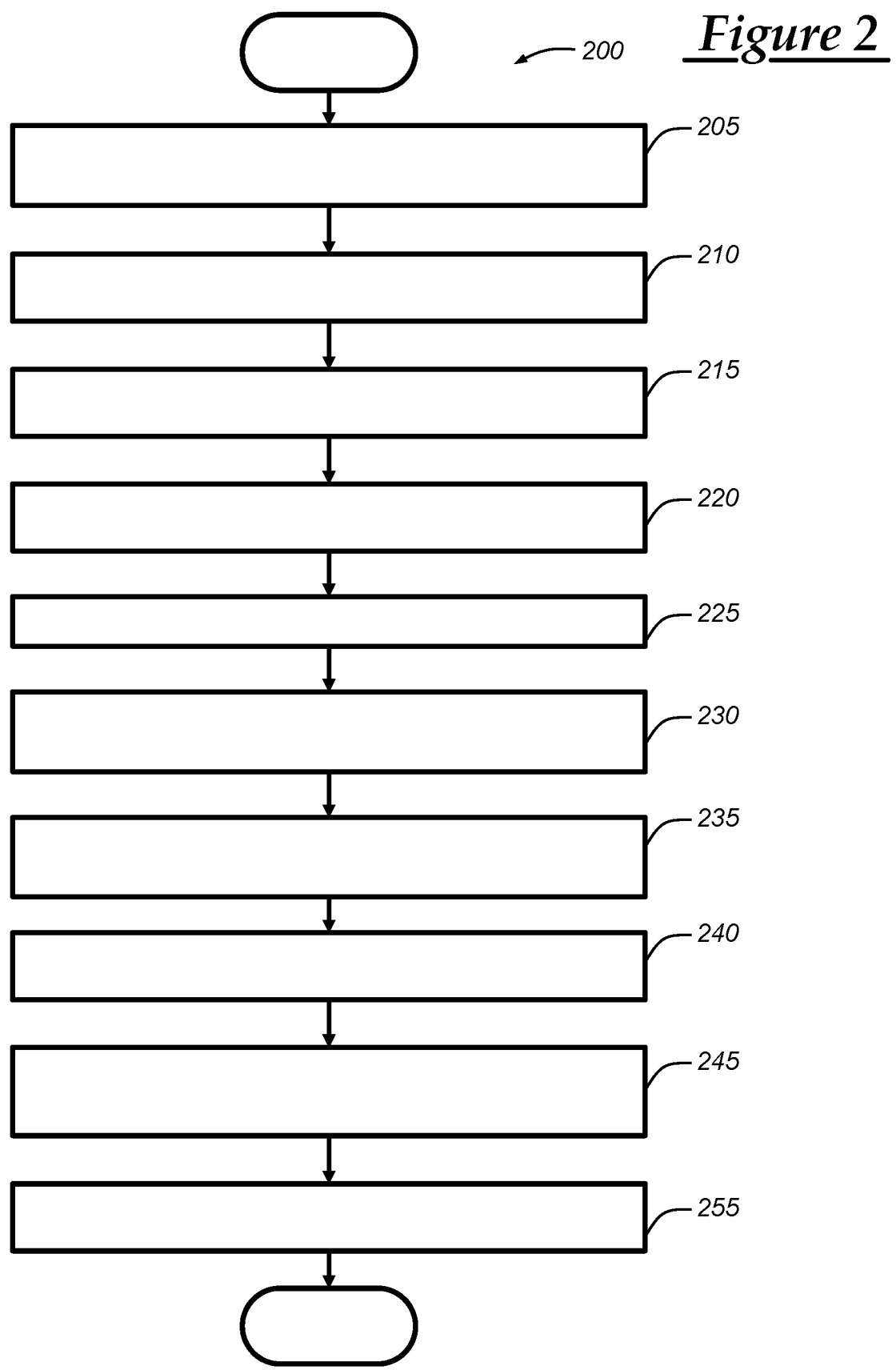

ESTABLISHING A SECURE SHORT-RANGE WIRELESS COMMUNICATIONS CONNECTION AT A VEHICLE

INTRODUCTION

The disclosure relates to establishing a short-range wireless communication connection between a vehicle and a mobile device.

Many electronic devices now carry out network communications. For example, many electronic devices can transmit voice and data communications over both a short-range wireless network, such as Bluetooth™ and/or a cellular network. Establishing a short-range wireless communication (SRWC) connection between a vehicle and a client device, such as a smartphone, may require user input and/or verification, which can be inconvenient. Also, establishing secure SRWC connections may take a myriad of steps, which can cost numerous resources and time.

SUMMARY

According to a first embodiment, there is provided a method of establishing a short-range wireless communications connection between a host device and a client device, wherein the host device includes a host certificate and a host key, the method including the steps of: transmitting an advertisement using a short-range wireless communications (SRWC) protocol from the host device to the client device; receiving a connection request message from the client device; receiving a client device verification message, wherein the client device verification message includes an encrypted client certificate, wherein the encrypted client certificate is a certificate that is encrypted using a client key, and wherein the host key and the client key are part of a common encryption scheme; decrypting the encrypted certificate using the host key to obtain the client certificate; verifying the client certificate using the host certificate; generating a shared secret; encrypting the shared secret using the host key; and sending the encrypted shared secret to the client device.

According to other embodiments, there is provided that of the first embodiment further including any one or more of the following:
 wherein the host device is a vehicle;
 wherein host key and the host certificate are obtained by the vehicle through a provisioning process that is performed during manufacture of the vehicle or during an initial configuration of the vehicle, and wherein the provisioning process includes configuring a secure VSM of the vehicle to include the host certificate;
 wherein the client device is a handheld mobile device;
 wherein the sending, transmitting, and receiving steps are carried out by a wireless communications device that is installed in the host device, and wherein the wireless communications device comprises a SRWC circuit that is used to carry out wireless communications via the SRWC protocol;
 the step of, in response to receiving the connection request message, operating the host device in a listening mode;
 wherein the client device verification message is received while the host device is operating in the listening mode;
 wherein the SRWC protocol is Bluetooth™ Low Energy;
 the step of receiving a connection verification message from the client device;
 the step of receiving a command request message from the client device via the established SRWC connection, wherein the command request message includes a command to be carried out using the host device;
 the step of, in response to receiving the command request from the client device, sending a challenge message to the client device using the established SRWC connection;
 the step of receiving a challenge response message from the client device using the established SRWC connection;
 the steps of: in response to receiving the challenge response message from the client device, verifying the challenge response message; and when the challenge response message is successfully verified, then carrying out the command;
 wherein the host device is a vehicle that includes a body control module (BCM), and wherein the BCM includes a root certificate store that includes the host certificate; and
 wherein the root certificate store is used by the vehicle to carry out the verifying step.

According to a second embodiment, there is provided a method of establishing a short-range wireless communications connection between a vehicle and a mobile device, wherein the vehicle includes a wireless communications device, wherein the wireless communications device comprises a short-range wireless communications (SRWC) circuit that is used to carry out wireless communications via a SRWC protocol, wherein the vehicle includes a secure VSM that stores a host key and a host certificate, and wherein the method includes the steps of: transmitting an advertisement using the SRWC protocol, wherein the SRWC protocol is a Bluetooth™ protocol, and wherein the advertisement includes information pertaining to the services that are offered by the vehicle via the Bluetooth™ protocol; receiving a connection request message from the mobile device via the Bluetooth™ protocol; in response to receiving the connection request message from the mobile device, operating the wireless communications device in a listening mode; while the wireless communications device is operating in the listening mode, receiving one or more mobile device verification messages, wherein at least one of the one or more mobile device verification messages include at least part of an encrypted client certificate, wherein the encrypted client certificate is a certificate that is encrypted using a client key, wherein the host key and the client key are part of a common encryption scheme; decrypting the encrypted certificate using the host key to obtain the client certificate; after decrypting the encrypted certificate, verifying the client certificate using the host certificate; in response to successfully verifying the client certificate, generating a shared secret; after generating the shared secret, encrypting the shared secret using the host key; after encrypting the shared secret, sending the encrypted shared secret to the mobile device; receiving a vehicle command request message from the mobile device, wherein the vehicle command request message includes a request to carry out a vehicle function; and carrying out the vehicle function using the vehicle.

According to other embodiments, there is provided that of the second embodiment further including any one or more of the following:
 wherein the vehicle includes a body control module (BCM), wherein the BCM includes a root certificate store, and wherein the root certificate store is used by the vehicle to carry out the verifying step;
 the step of receiving a challenge response message from the mobile device using the established SRWC connection;

the steps of: in response to receiving the challenge response message from the mobile device, verifying the challenge response message using the BCM; and when the challenge response message is successfully verified, carrying out the vehicle command; and the step of, when the challenge response message is unsuccessfully verified, terminating the established SRWC connection.

BRIEF DESCRIPTION OF THE DRAWINGS

Exemplary embodiments will hereinafter be described in conjunction with the appended drawings, wherein like designations denote like elements, and wherein:

FIG. 2 is a flowchart illustrating a method of establishing a short-range wireless communications connection between a vehicle and a mobile device.

DETAILED DESCRIPTION

Figure 1:
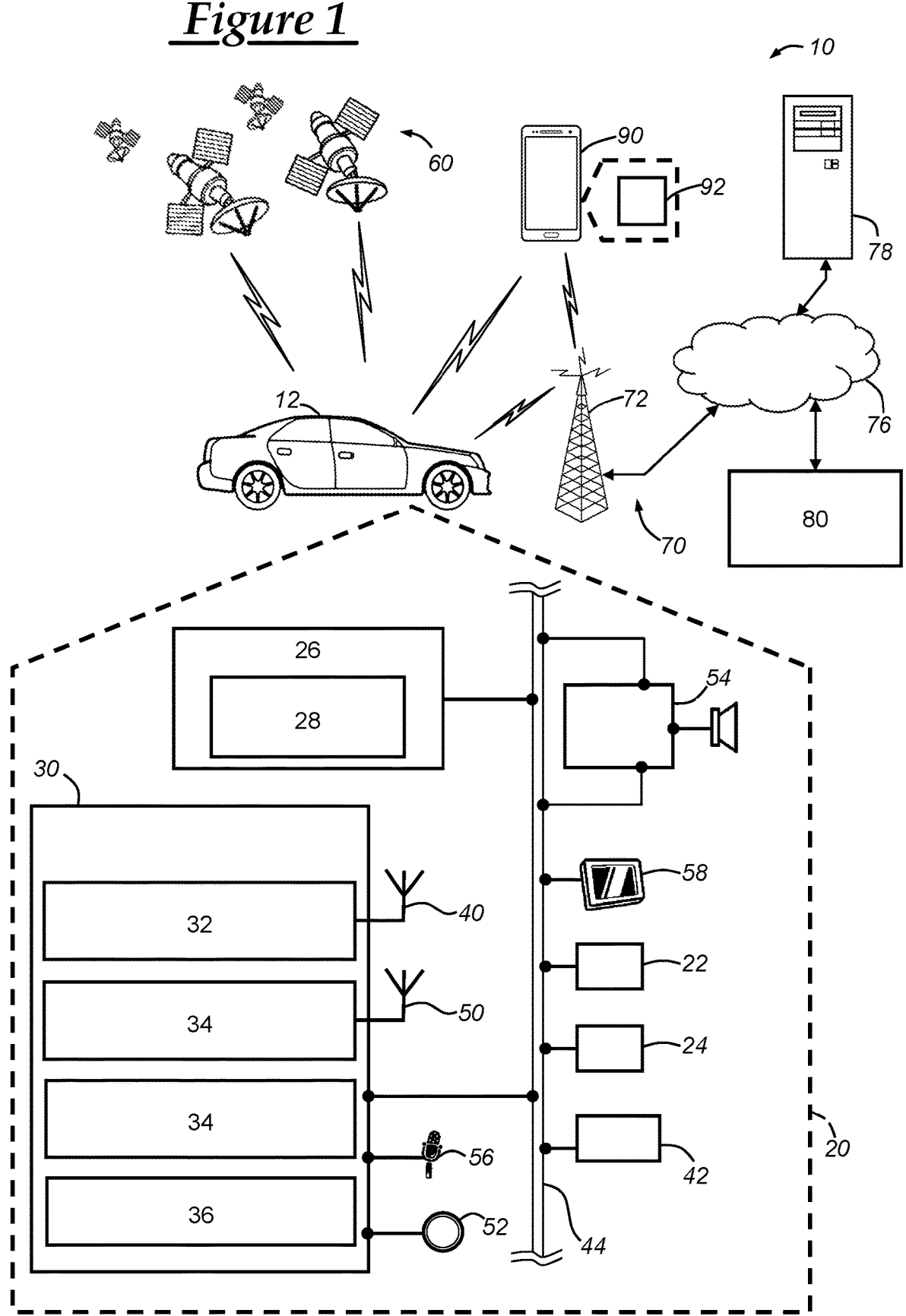
FIG. 1 is a block diagram depicting an embodiment of a communications system that is capable of utilizing the method disclosed herein.

The system and methods below enable a host device to establish a secured short-range wireless communication (SRWC) connection with a client device using Out of Band (OoB) technologies. As used herein, Out of Band (OoB) refers to those technologies that are different from the SRWC technology that is used in the secure SRWC connection between the host device and the client device. In one scenario, a host device (e.g., a vehicle) may be reserved for use by a particular user through use of a client device, such as a smartphone or a computer. The client device can send reservation parameters to a remote server, which can then generate a client certificate for use in establishing a secure connection between the host device (e.g., vehicle) and the client device (e.g., a smartphone). Any one or more certificates discussed herein can include a public key that can be used in verifying the authenticity of the certified device (i.e., the device providing the certificate). The client certificate and one or more virtual keys (i.e., encryption keys) (such as a private key corresponding to the public key of the client certificate) can be sent to the client device for use in establishing a secure SRWC connection with host device. In some embodiments, the client certificate and client keys can be generated based on information known or stored at the host device, such as a host certificate or a set of host certificates that were provisioned into the host device at the time of manufacture or sale. And, the client keys can correspond to keys stored at the host device, such as, for example, the client and host keys can be a part of a common encryption scheme. Through one or more embodiments of the method discussed herein, the client device and the host device can establish a SRWC connection upon the devices coming into SRWC range of one another through use of the host and client certificates and/or keys.

In a first scenario, the host device can be a vehicle that was reserved for use by a user of a mobile device, which can be the client device. The user may desire to use the client device to connect to the vehicle such that the user can control one or more vehicle functions through use of the mobile device (e.g., a smartphone). The vehicle (or other host device) may be provisioned (e.g., at the time of manufacture or sale) with a particular certificate or set of certificates (the host certificate(s)) and, in some embodiments, a second certificate can be generated based on the host certificate(s) that are known to the vehicle. Then, the vehicle may periodically transmit an advertisement and, upon the mobile device receiving the advertisement, the mobile device and vehicle can use the client and host certificates to establish a secure SRWC connection. In one embodiment, the SRWC connection may be a Bluetooth™ Low Energy (BLE) connection. After a secured SRWC connection is established (e.g., a shared secret for use in the SRWC connection is established), the mobile device and vehicle can communicate securely with one another—for example, the mobile device may send a command to the vehicle that instructs the vehicle to carry out one or more vehicle functions.

In another scenario, the host device can be a parking lot gate and the client device can be a vehicle that desires to operate the parking lot gate. In such an embodiment, the vehicle can be issued a client certificate that was generated based on the parking lot gate's provisioned certificate(s) (host certificate(s)) and, thereafter, a SRWC connection can be securely established through communicating and verifying the client certificate with the host certificate.

In one embodiment, the method can begin by provisioning the host device (e.g., the vehicle) with one or more host certificate(s). Then, a user may request control of or reserve the host device through sending a reservation or control request to a remote server. The remote server can then generate a client certificate based on the one or more host certificate(s) and, subsequently, send the client certificate and a private key corresponding to the client certificate to the client device (e.g., the mobile device). The vehicle can periodically transmit advertisements using a SRWC protocol (e.g., Bluetooth™ Low Energy (BLE)) and, in response to receiving and verifying an advertisement, the mobile device can send the client certificate to the vehicle, which can then verify the certificate by determining whether the client certificate corresponds to the host certificate(s). Once verified, the vehicle can generate a shared secret and then encrypt the shared secret with the public key of the client certificate. The encrypted shared secret can then be sent to the mobile device, which will decrypt the encrypted shared secret with the private key that was issued to the mobile device by the remote server. Thereafter, the vehicle and the mobile device can communicate with one another securely through use of the shared secret, which can be a private symmetric encryption key, for example.

Referring now to FIG. 1, there is shown an operating environment that comprises a communications system 10 and that can be used to implement the method disclosed herein. Communications system 10 generally includes a vehicle 12 with a wireless communications device 30 and a body control module (BCM) 26, a constellation of global navigation satellite system (GNSS) satellites 60, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a remote server accessible by vehicle 12. Other such accessible computers 78 can be, for example: a public key infrastructure (PKI) server used to generate security entitlements; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions through use of one or more electronic servers. For example, remote facility 80 may be used in part to implement a car sharing service. In such a case, remote facility 80 may coordinate registrations of vehicles, store data pertaining to the registrations or other aspects of the car sharing service, and/or provide authentication and authorization data (e.g., certificates and encryption keys) to SRWC devices (e.g., personal mobile device 90), users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

The personal mobile device 90 is a mobile device and may include: hardware, software, and/or firmware enabling cellular telecommunications and SRWC as well as other mobile device applications. As used herein, a personal mobile device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of personal mobile device 90 may comprise: a processor and memory (e.g., non-transitory computer readable medium configured to operate with the processor) for storing the software, firmware, etc. The personal mobile device's processor and memory may enable various software applications 92, which may be preinstalled or installed by the user (or manufacturer) (e.g., having a software application or graphical user interface (GUI)).

One implementation of a vehicle-mobile device application 92 may enable a vehicle user to communicate with the vehicle 12 and/or control various aspects or functions of the vehicle, some of which are listed below. Also, in some embodiments, application 92 may enable the user to make a reservation to use a vehicle that is a part of a car sharing service. Additionally, the application 92 may also allow the user to connect with the remote facility 80 or call center advisors at any time. In other embodiments, there may be a plurality of personal mobile devices or mobile devices 90. Such devices may communicate with wireless communications device 30 or with each other according to one or more SRWC technologies or wired connections, such as a connection using a Universal Serial Bus (USB) cable.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a GPS module 22, engine control unit (ECU) 24, a body control module (BCM) 26, a wireless communications device 30, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GPS module 22, ECU 24, BCM 26, wireless communications device 30, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. In one particular embodiment, BCM 26 may be isolated and connected to the wireless communications device 30 and select VSMs on an isolated portion of the bus 44, or connected to the wireless communications device 30 and select VSMs via a separate communications bus. BCM 26 can include a processor and/or memory, which can be similar to processor 36 and memory 38 of wireless communications device 30, as discussed below. BCM 26 may communicate with wireless communications device 30 and/or one or more vehicle system modules, such as GPS 22, audio system 54, or other VSMs 42. BCM may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. Further, the wireless communications device 30 may provide the BCM 26 with information. For example, BCM 26 may receive a notification or indication from wireless communications device 30 that a certain wireless service is available (e.g., a wireless network connection is available) and/or that a SRWC connection has been established with a SRWC device, such as mobile device 90.

In one particular embodiment, the vehicle may include a root certificate store 28 that is located and/or securely stored in the body control module 26. Here, "securely stored" means that tampering of the root certificate store will cause the BCM to become locked up and/or effectively unusable. In such a scenario where the BCM is locked up due to tampering, the vehicle may need to be re-flashed or re-provisioned by an OTA or other authority. The re-flash or re-provision can include configuring the vehicle with a new certificate or set of certificates. The root certificate store may be a set of computer instructions and/or data that acts to verify the authenticity of certificates received at the vehicle. The root certificate store can hold one or more keys or certificates (i.e., a keystore), such as those received from or generated based on information received from remote facility 80. When the BCM's root certificate store is compromised or accessed without authorization, then the keystore of the BCM may be considered invalid—if the root certification store has not been compromised, then the keystore is considered valid. The root certificate store 28 may act as a gatekeeper between the mobile application 92 and the VSMs at vehicle 12. The root certificate store can hold various certificates that may be used to verify client certificates that are sent to the vehicle (or other host device) through comparing information in the received client certificates with the information in the stored host certificates. Also, it should be appreciated that the remote facility that issues a client certificate to the mobile device can include information relating to the host certificate(s) and/or host keys. For example, the remote facility could include a copy of the host keys and/or certificates and, when a reservation or control request is received, the remote facility can use this information to derive a client certificate and/or client keys that can be used later by the vehicle in authenticating the client device, as discussed more below.

In addition to housing the root certificate store 28, the BCM 26 may manage a reservation table that includes information pertaining to certain reservations that were made for vehicle 12. The table can include a row (or tuple) for each wireless link—e.g., each SRWC link or connection that is or may be established between the vehicle and a mobile device, as will be explained more below. The table can include various reservation information, such as that information received in step 205 of method 200 (see FIG. 2), including a certificate for a particular mobile device (e.g., mobile device 90).

Wireless communications device 30 is capable of communicating data via short-range wireless communications (SRWC) and, in some embodiments, may be capable of communicating data via cellular network communications. As shown in the exemplary embodiment of FIG. 1, wireless communications device 30 includes an SRWC circuit 32, a cellular chipset 34, a processor 36, memory 38, and antennas 40 and 50. In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), BCM 26, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Wireless communications device 30 may enable vehicle 12 to be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. In one embodiment, device 30 includes an application that carries out at least some of the method illustrated below in FIG. 2. Memory 38 may include RAM, other temporary powered memory, any non-transitory computer-readable medium (e.g., EEPROM), or any other electronic computer medium that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as personal mobile devices 90. A connection between the wireless communications device 30 and one or more devices 90 may allow for the operation of various vehicle-device functionality. Vehicle-device functionality (or function) refers to any function of the vehicle that may be complimented, improved, supported, or carried out through a mobile device; any function of the mobile device that may be complimented, improved, supported, or carried out through the vehicle; or any other function that may be carried out using the vehicle and one or more mobile devices. For example, vehicle-device functionality can include using the mobile device 90 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the personal mobile device with hands-free calling, such as through use of vehicle-user interfaces to place, receive, and carry out voice calls; sending information to the personal mobile device, such as geographical information to the mobile device 90 (such as information obtained from the GPS module 22) or vehicle diagnostic information or codes; and carrying out commands (e.g., commands to perform certain vehicle functions) received at the vehicle from the personal mobile device.

A vehicle function is any function or operation that may be performed by the vehicle, including initiating or booting a telematics unit, a GPS module, an infotainment unit, a center stack module (CSM), or other VSM. Additionally, a vehicle function may be unlocking or locking the vehicle doors via the BCM, starting the ignition or primary propulsion system of the vehicle, disabling/enabling the vehicle ignition or primary propulsion system, heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., information pertaining to a car sharing service reservation) or content data (e.g., audio/video playlists or files) from a remote facility 80 or computer 78 (including information that may be particular to the user of the SRWC device and/or associated with the SRWC device), downloading or uploading information and/or content data from or to the SRWC device, and/or performing various other operations or functions of the vehicle, many of which are described herein.

Wireless communications device 30 may be set to a discovery mode when the vehicle desires to connect to a SRWC device, such as personal mobile device 90. As used herein, a discovery mode is an operating mode for a SRWC device in which the SRWC device attempts to discover or detect other SRWC devices using a SRWC protocol or technology. The discovery mode may include periodically or intermittently sending out messages or advertisements in an attempt to elicit a response from other SRWC devices in range. In one embodiment, the wireless communications device 30 may transmit a Bluetooth™ Low Energy advertising package (e.g., an advertisement), such as an ADV_IND (an undirected advertisement) message, an ADV_DIRECT_IND (a directed advertisement) message, or an ADV_SCAN_IND (scan-able undirected advertisement). For example, the wireless communications device 30 may transmit an ADV_IND message according to a predefined or predetermined time interval (e.g., 30 milliseconds (ms)). Or, the device 30 may vary the time interval by randomizing the interval (e.g., randomly or pseudo-randomly selecting a time between 10 ms and 40 ms for each advertisement).

Upon detection of a SRWC device (e.g., a personal mobile device) or receipt of a wireless advertisement or other message from a SRWC device, the wireless communications device 30 may communicate with the client device to establish a secured connection by transmitting and receiving one or more wireless messages. In one embodiment, the personal mobile device 90 (e.g., the client device) may receive the advertisement and then send a connection request in response thereto. The wireless communications device 30 can then detect the mobile device 90 through receiving the connection request message from device 90. The connection request message from device 90 indicates that the device 90 desires to establish a SRWC connection with the vehicle 12. Subsequent communications between the vehicle and the mobile device may be carried out to establish the SRWC connection. For example, vehicle 12 and mobile device 90 may carry out a pairing process to establish a Bluetooth™ Low Energy connection, which may involve user verification (e.g., verification of a pin or alphanumeric string).

In one embodiment, a SRWC connection may be established according to a BLE protocol and using Out of Band (OoB) technologies to share a certificate, which may thereby allow the SRWC connection to be established securely and potentially without user verification or action. In one scenario, a user of mobile device 90 may have reserved vehicle 12 as part of a car sharing service. Upon creation of the reservation, a remote server, such as a server at remote facility 80 or computer 78, may generate a client certificate and, subsequently, send the client certificate to the mobile device 90. The client certificate can be generated based on a certificate or set of certificates that are associated with the reserved vehicle (i.e., host certificate(s)). The reserved vehicle can store the host certificates in a memory device, such as in the root certificate store 28 included in BCM 26. The client certificate may be used during the SRWC connection establishment process and, at least in some embodiments, may enable a secure connection to be established without user intervention (e.g., user verification of a pin or alphanumeric string). Additionally, the remote server may issue a private key to the mobile device 90 that corresponds to a public key of the client certificate (e.g., the public and private keys are a part of a common encryption scheme). The private and public key may be generated by the remote server (or another remote server) and may be sent to the mobile device (or other client device) via cellular carrier system 70. In other embodiments, a private key encryption scheme or symmetric key encryption scheme may be used in which a private key is issued both to the vehicle 12 and the mobile device 90. In yet another embodiment, the private and/or public keys can be associated with the certificate sent to the mobile device and/or the certificate known to the vehicle. For example, either or both certificates can be a public key certificate that includes a public key, which can be sent to the vehicle and/or the mobile device. In many embodiments, the vehicle can include one or more host certificates that can be used to verify the client certificate received from the client device and, finally, to establish a secured SRWC connection.

The establishment of the secured SRWC connection may include generating and/or sharing a secret between the vehicle and the mobile device (the "shared secret"). In one embodiment, in response to receiving the client certificate from the mobile device, the vehicle can verify the certificate and, subsequently, generate a shared secret (e.g., a symmetric encryption key). In one embodiment, the client certificate can be generated based on the host certificate such that the host certificate can be used to verify that the client device is properly authenticated as being a device that may access or control the vehicle. The shared secret can be encrypted using the public key of the client certificate and, thereafter, the encrypted shared secret can be sent to the mobile device (or other client device). The mobile device can then decrypt the encrypted shared secret using the private key received from the remote server to obtain the shared secret, which can then be used in subsequent SRWC between the vehicle and the mobile device. Once the mobile device 90 and the vehicle 12 obtain the shared secret, the mobile device 90 and vehicle 12 can store the shared secret. The storing of the shared secret at each respective device results in the devices being "bonded" to one another such that establishment of future SRWC connections between mobile device 90 and vehicle 12 may be expedited by accessing the stored shared secret instead of having to generate a new shared secret.

In some cases, the mobile device 90 and the wireless communication device 30 may already have been "bonded" to one another. As used herein, "bonded" means that two devices (e.g., the wireless communications device 30 and personal mobile device 90) have previously obtained a shared secret and each has stored the shared secret, which may be an identifier, and/or other information that allows the devices to subsequently establish a new connection without having to carry out the pairing process (i.e., exchanging security codes or keys). "Bluetooth™ bonded" refers to devices that are bonded using Bluetooth™ as the SRWC. Upon detection of a SRWC device, the wireless communications device 30 may determine whether the wireless communications device 30 is bonded to the SRWC device.

Once a connection is established between the wireless communications device 30 and the personal mobile device, such as mobile device 90, wireless messages may be sent between the vehicle and the personal mobile device. These wireless messages and/or the SRWC that sent these wireless messages may be authenticated and/or authorized by the vehicle. The authorization and/or authentication of the personal mobile device (or other SRWC device) may include verifying the identity of the personal mobile device and/or the user of the personal mobile device, as well as checking for authorization of the personal mobile device and/or the user of the personal mobile device. This verification may include comparing a key (e.g., a string or array of bits) included in the connection request (or subsequent message) with a key at the vehicle. In some embodiments, a certificate that is pre-provisioned into the vehicle can be used to verify the mobile device, as explained in more detail below in method 200 (FIG. 2).

The communications between the vehicle and the personal mobile devices may allow for functionality of the smartphone to be used by the vehicle electronics, or vice versa. For example, in the case where the personal mobile device is a cellular-enabled smartphone, received calls at the smartphone may be carried out through the audio system 54 and/or through use of microphone 56 of the vehicle electronics 20. This may be done so through the phone sending all received audio data or signals to the wireless communications device 30, which then may use bus 44 to send the audio signals to audio system 54. Likewise, video received at the smartphone 90 may be sent to the visual display 58 via the wireless communications device 30. Also, audio received at microphone 56 in the vehicle electronics may be sent to the smartphone 90 via wireless communications device 30.

In some scenarios, the user may desire to control certain vehicle functionality through use of application 92 on device 90. In such a case, the vehicle may receive an initial command request and, in response thereto, may require further verification from device 90. The further verification may include sending a challenge message to the device 90 from vehicle 12 and, subsequently, receiving and verifying a challenge response message from device 90. Upon the challenge response message being verified, authenticated, and/or authorized, the vehicle may carry out the requested command, which can include sending messages to one or more VSMs. As mentioned above, root certificate store 28 may act as a gatekeeper between the mobile application 92 and the VSMs at vehicle 12.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. From these signals, the module 22 can determine vehicle position which may enable the vehicle to determine whether it is at a known location, such as home or workplace. Moreover, GNSS module 22 can provide this location data to wireless communications device 30, which can then use this data to identify known locations, such as a vehicle operator's home or workplace. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

With reference to FIG. 2, there is shown an embodiment of a method 200 of establishing a short-range wireless connection (SRWC) between a host device and a client device. The method 200 can be carried out by various devices that desire to establish a secured SRWC connection, such as a Bluetooth™ Low Energy (BLE) connection. As used herein, a "client device" is a SRWC device that includes short-range wireless communication (SRWC) circuitry and that seeks to establish a connection with a host device so that the client device may carry out host device functionality, such as controlling one or more operations of the host device. And, as used herein, a "host device" is a SRWC device that includes short-range wireless communication (SRWC) circuitry and that is capable of offering one or more services to a client device, such as allowing a client device to control various operations of the host device.

In a first scenario, the client device can be a mobile device 90, such as a smartphone 90, and the host device can be a vehicle, such as vehicle 12. In the first scenario, the smartphone 90 can be used to control various operations of the vehicle 12, such as performing lock and unlock operations, controlling the vehicle ignition, etc. In a second scenario, the client device can be vehicle 12 and the host device can be a parking lot gate (e.g., a boom gate). In this second scenario, the vehicle can use a SRWC connection to control various aspects of the parking lot gate, such as controlling an actuator that opens and closes access to a driveway thereby allowing/disallowing vehicular access. Although the method 200 is discussed with respect to the first scenario, it should be appreciated that the method 200 can be carried out according to various scenarios that include various different host and client devices, such as the second scenario.

Method 200 begins with step 205, wherein the vehicle obtains one or more host certificates and/or one or more host keys. Although multiple host keys can be included in the host device (e.g., the vehicle), the method 200 is discussed with respect to a single host key. In some embodiments, the host key and the host certificate can be obtained by the vehicle through a provisioning process that is performed during manufacture of the vehicle or during an initial configuration of the vehicle. The provisioning process can include configuring a secure VSM of the vehicle to include the host certificate (and, thus, the public key of the host certificate), such as the root certificate store 28 included in BCM 26. Here, "provisioned" refers to initial programming and/or configuring that can be done at the manufacturer or upon sale of the vehicle. In some embodiments, the vehicle can be provisioned via over-the-air (OTA) programming that includes receiving the provisioned information, which can include the host key and/or the host certificate, from a remote server. The host certificate may be an X.509 public key certificate, a digital token (e.g., a Java Web Token (JWT)), or any other suitable information that can be used to authenticate the client devices (e.g., mobile device 90). The host certificate can include a public key (or host public key), a hostname, and/or other identifying information.

In one embodiment, the host certificate (or any of the other certificates discussed herein) may be issued by a certificate authority located at the remote server or by a trusted certificate authority. And, in a particular embodiment, the remote server may be implemented as an intermediate certificate authority that is verified as such by a trusted certificate authority. The intermediate certificate authority may be controlled and operated at a remote facility of the OEM of the vehicle (or other host device) or other party associated with the client and/or host devices.

After the vehicle is provisioned, the vehicle may be reserved by a user through use of a mobile device and/or another web-portal. The remote facility can receive a reservation request (or chain-of-control request) and, based on this request, the remote facility can generate a reservation of a particular vehicle, such as vehicle 12. As used herein, a chain-of-control request is a request to access or operate a host device through use of a client device. Thereafter, the remote facility can send reservation information to the vehicle and to the mobile device. The mobile device can be sent a vehicle identifier, reservation identifier, or any other information pertaining to the reservation, chain-of-control request, and/or the vehicle. In one particular embodiment, the mobile device can be sent a hashed vehicle identifier number (VIN) that corresponds to the reserved vehicle. The reservation information can be received from the remote server via land network 76 and/or cellular carrier system 70. In other embodiments, the reservation information can be received from another device via short-range wireless communications or via other communications using IEEE 802 protocol(s) (e.g., IEEE 802.11 (Wireless LAN), IEEE 802.15.1 (Bluetooth™) IEEE 802.3 (Ethernet)).

Also, once a reservation request or chain-of-control request is received, the remote facility 80 can generate a client certificate and/or one or more client keys for use with the mobile device and the vehicle. The client certificate can include a public key and a private key can also be generated that corresponds to the public key. In one embodiment, the client certificate is generated along with a private client key that corresponds to one or more host keys stored at the host device (such as a corresponding public key). In other embodiments, the client device may be sent other information or keys, such as a public key that corresponds to a private key known to the vehicle. Thus, when the mobile device and vehicle share information, such as when the mobile device sends the certificate to the vehicle (step 225), the communications can be encrypted using the public key and then decrypted using the private key known to the vehicle. The remote facility 80 can then send the certificate and/or keys to the mobile device via land network 76 and/or cellular carrier system 70. In one embodiment, the remote facility 80 can send a client certificate that includes a public key and can send a private key that corresponds to the public key of the client certificate.

Once reservation information is sent out by the remote server, the user may initiate a scanning procedure using their mobile device 90. The scanning procedure may set the mobile device 90 into a listening mode whereby the device 90 listens for messages, particularly for advertisements sent out by vehicle 12. The method 200 continues to step 210.

In step 210, the vehicle may transmit an advertisement using a short-range wireless communication (SRWC) protocol, wherein the advertisement includes reservation information. The vehicle may use wireless communications device 30 to transmit SRWC messages, such as Bluetooth™ Low Energy (BLE) messages, using SRWC circuit 32. The advertisements may include metadata (including data specifying the type of wireless message) and other various information, such as services offered by the vehicle via a SRWC connection (including service identifiers), a reservation identifier, vehicle identifiers (e.g., VIN), application version numbers, beacon source identifiers, a Bluetooth™ SIG identifier, and a Universally Unique Identifier (UUID). In one embodiment, the advertisements can include information pertaining to the services that are offered by the vehicle via the Bluetooth™ protocol. In one particular embodiment, the advertisement can include a car type, such as a model and model-year, and one or more services that are offered by the vehicle. And, in another embodiment, the advertisement can include the hashed VIN that was sent to the mobile device from the remote facility in response to the reservation request or chain-of-control request.

Once the mobile device 90 receives the advertisement, device 90 can verify that the advertisement was sent from a vehicle that corresponds to the reservation that was made by the user of the mobile device 90. The verification of the advertisement by the mobile device can be carried out to determine whether the mobile device should interact with the vehicle. This verification can be based on one or more factors, including the content or payload of the advertisement, a received signal strength indicator (RSSI) of the advertisement, metadata encoded in the advertisement, a vehicle identifier (e.g., a vehicle identification number (VIN)), a vehicle classifier (e.g., a model and make of the vehicle), a reservation identifier (i.e., an identifier that specifically identifies the vehicle as the target vehicle or the reserved vehicle), contextual factors relating to the reservation (e.g., time of day with respect to the reservation time, the present location with respect to the reservation location), contextual factors relating to the user or the mobile device (e.g., external authorizations or entitlements of the mobile device, user registration status and/or standing), contextual factors relating to the vehicle (e.g., whether the vehicle is "in service" or not "in service", the time of day, valid keystore), and/or any combination of these factors. For example, this can include ensuring that the UUID matches a UUID known to device 90 or that was received from a remote server, that the reservation identifier matches a reservation identifier at the mobile device, and that the version numbers of the application 92 and the version number specified in the advertisement correspond to one another. Once the verification is successful, the mobile device 90 can generate and present a confirmation to connect prompt to the user using one or more interfaces on the mobile device, such as a display. For example, the confirmation to connect prompt can prompt the user: "Vehicle 12 Found. Connect?" and, in response to the prompt, the user can indicate their response (e.g., "Yes" or "No"). If the user affirms the confirmation to connect prompt, then mobile device 90, using application 92, can generate and send a connection request message to wireless communications device 30. In other embodiments, the mobile device 90 may not present a confirmation to connect prompt and can automatically generate and send the connection request message to the wireless communications device 30. The method 200 continues to step 215.

In step 215, the vehicle receives a connection request message from the mobile device. The connection request message may be a standard connection request message that is used for a particular protocol, such as a CONNECT_REQ message that is used for BLE connections. The connection request message can also include the client certificate and may encrypt the client certificate using a private or public key that was issued by a remote server and/or as a part of the reservation. For example, the certificate may be encrypted using a private client key that was generated and sent to the mobile device, wherein the private client key is a part of a common encryption scheme as a host key that was provisioned into the vehicle. Or, in another embodiment, the client certificate can be encrypted with a public key that corresponds to a private key known to the vehicle (e.g., a host key that was provisioned into the vehicle). The connection request is received by the wireless communications device 30. The method continues to step 220.

In step 220, the vehicle sets wireless communications device 30 to operate in a listening mode. This step may be carried out in response to receiving the connection request message. In one embodiment the connection request message may include an encrypted certificate and, if so, the vehicle may not set the wireless communications device 30 to a listening mode. As used herein, a device is said to be in a "listening mode" when the device refrains from transmitting signals over one or more channels, frequency bands, or frequencies (e.g., the device can be in a listening mode with respect to particular frequencies, or may generally be in a listening mode in which it suspends all communications using a particular protocol or SRWC circuit). Once the connection request is received, the vehicle may operate the wireless communications device 30 in a listening mode.

In step 225, the certificate may be sent from the mobile device 90 to the vehicle 12 using one or more mobile device verification messages. In such a scenario, the mobile device 90 may send a CONNECT_REQ message to the vehicle (step 215) to indicate that the device 90 is about to attempt to connect with wireless communications device 30 and, thus, causing the wireless communications device 30 to be set to operate in a listening mode (step 220). The mobile device 90 may then send one or more subsequent wireless messages (or "mobile device verification message(s)"), some or all of which contain at least a portion of the encrypted client certificate (a certificate encrypted with a key). In some embodiments, multiple messages may be necessary to send the entire client certificate since the size of the encrypted client certificate may exceed the allotted message size or payload that is used by the particular SRWC protocol, such as BLE.

In one embodiment, the client certificate can be encrypted with a key that was sent to the mobile device from the remote server and that is based on a chain of trust that propagates back to the host certificate. The key may be a private key that was received by the mobile device from the remote server and that corresponds to a public key known to the vehicle, such as where the public and private keys are a part of a common encryption scheme. In one embodiment, the keys may be associated or part of one or more certificates, such as the host certificate or set of host certificates known or provisioned into the vehicle. In other embodiments, a public key, which corresponds to a private key that is known to the vehicle, may be issued to the mobile device that can be used to encrypt the client certificate. And, in yet another embodiment, an encrypted client certificate can be sent to the mobile device from the remote facility; thus, the mobile device may forward the encrypted client certificate to the vehicle; in such an embodiment, the encrypted certificate can be encrypted using any one or more keys discussed herein such that the vehicle will be able to decrypt or otherwise verify the encrypted certificate. Or, the public key used to encrypt the client certificate can be sent to the mobile device from the vehicle. Once the vehicle determines or realizes that it has received the entire encrypted certificate, the vehicle may then terminate the listening mode and/or resume normal operation. The method 200 continues to step 230.

In steps 230 and 235, the encrypted certificate may be verified by the vehicle. The verification process may include two steps: (1) decrypting the encrypted client certificate using a host key (the key issued to the vehicle) to obtain the client certificate; and (2) determining if the host certificate (e.g., a certificate known to the vehicle) corresponds to the client certificate. In step 230, the encrypted client certificate is decrypted using a key. In one embodiment, the client certificate can be encrypted using a private key that corresponds to a public (or private) key known to the vehicle, such as a public key associated with the host certificate known to the vehicle and, accordingly, the vehicle can decrypt the encrypted client certificate using the corresponding public or private key. As mentioned above, a different encryption scheme may be used, such as through use of symmetric key encryption (i.e., where both the vehicle and the mobile device have a common private key). Steps 230 and 235 can be carried out by a secure VSM of the vehicle, such as BCM 26 (using root certificate store 28) or another vehicle system module (VSM) that is connected to the wireless communications device 30 via a secured and/or isolated communications bus. In one particular embodiment, the "secure VSM" can be a body control module of the vehicle, such as BCM 26. The method 200 continues to step 235.

In step 235, the client certificate may be deemed to correspond to the host certificate if the certificates match or the client certificate otherwise indicates that it relates or is derived from the first certificate. This step can be carried out by BCM 26 and/or root certificate store 28. If the client certificate (e.g., the certificate received from mobile device 90) does not correspond to the host certificate (or is otherwise verified by the root certificate store 28), then the method 200 may proceed back to step 210. The method 200 continues to step 240.

In step 240, the vehicle generates a shared secret. As used herein, a "shared secret" is a key, token, string of characters and/or numbers (or bytes), or other identifier that is kept confidential by the host device and only issued to those authenticated and/or authorized devices whom the host device desires to communicate with, and which may be unique to each SRWC connection between the host device and a given client device. However, in some embodiments, the shared secret can be common to all devices that are a part of the same reservation or chain of control, as discussed more below. The shared secret may be generated by processor 36, may be stored in memory 38, and may be encrypted using one or more keys known to the vehicle (see step 245).

In some embodiments, a second client device may desire to "pair" or otherwise establish a SRWC connection with the host device (e.g., the vehicle). In such a case, the vehicle may use the reservation table stored in BCM 26 to keep track of the various mobile devices. In a scenario where the second mobile device (or second client device) is associated with the same reservation as the first mobile device (or first client device), the vehicle can issue the same shared secret to both devices. Or, the vehicle may generate a second shared secret for use with the second device. Also, the second mobile device 90 and vehicle 12 may be issued a second certificate (i.e., a certificate different than the certificate issued to the first device 90) (step 205) that can be used for establishing the SRWC connection between the vehicle 12 and the second mobile device—e.g., using steps 210-250. In any event, any or all of this information can be stored in the reservation table and maintained by the BCM 26. The method 200 continues to step 245.

In step 245, the shared secret is encrypted using the public key that was included in the client certificate that was received by the vehicle (step 225). The message may be encrypted using Advanced Encryption Scheme with Counter with CBC-MAC (AES-CCM) or AES with Galois Counter Mode (AES-GCM). Once the message is received by the mobile device, the mobile device can decrypt the encrypted shared secret using the private key that was issued to it by the remote server (or that was otherwise obtained by the mobile device) to thereby obtain the shared secret. In a scenario where there are multiple client devices associated with a reservation or chain-of-control of the host device, the same shared key can be sent to the multiple client devices, but the shared secret may be encrypted using each of the client devices' public key that was included in each of the client devices' certificate that is sent to the vehicle (step 225). The shared secret may then be used by both the vehicle 12 and the mobile device 90 to carry out secure communications using SRWC, such as BLE. The method 200 continues to step 250.

In step 250, a connection verification message is received from the mobile device. This message may be a LL_CONNECTION_UPDATE_REQ or other suitable message indicating that the mobile device 90 has successfully obtained the shared secret and/or has established a secure connection with the vehicle 12. As a result, the vehicle may store the shared secret in a table (e.g., the reservation table) and associate the shared secret with the mobile device 90. The mobile device 90 may do the same—storing the shared secret and associating it with the vehicle.

Once the SRWC connection has been securely established, the mobile device may send commands (via command request messages) to the vehicle using the secured SRWC connection. The commands may be any vehicle commands (see non-exhaustive list above). Also, vehicle 12 and mobile device 90 may share other information, such as vehicle status and/or media content. The commands and/or other information may be sent by the mobile device and may include the shared secret such that the vehicle (or mobile device) can verify the authenticity of the message and/or assess the authorization of the message. Additionally, upon receiving a command request message from the mobile device 90, the vehicle may send a challenge message to the mobile device. Then, the mobile device can receive the challenge message and, subsequently, generate and/or send back a response message to the challenge message. Once the mobile device receives the challenge response message, the mobile device can verify the response using the BCM, such as by verifying whether certain information (e.g., a token) included in the challenge response message corresponds to information included in the challenge message. Upon receiving the response message, the vehicle 12 may then verify its contents and, if successful, may carry out the requested command.

In some embodiments, an established and secured SRWC connection may be inactivated due to a period of inactivity (i.e., a period of no communications between the vehicle and the mobile device 90 via the established SRWC connection). Or, the connection may be inactivated upon receipt of an unsuccessful challenge response and/or a detection that the mobile device 90 is out of range of the vehicle 12. An "Active/Inactive" flag indicating whether the SRWC connection is presently active may be kept in the reservation table in the BCM. And, upon receiving a successful challenge response message, the vehicle may set the "Active/Inactive" flag to true and activate the SRWC connection (i.e., allow communications over the SRWC connection to be carried out). As used herein, the SRWC connection may be "active" when the SRWC connection is considered presently established. In one embodiment, if the vehicle receives a predetermined amount of unsuccessful challenge response messages, then the vehicle may entirely delete the SRWC connection entry for the mobile device 90 from the reservation table thereby terminating the SRWC connection. Additionally, a clean-up process may be executed by the BCM to clean up expired or terminated SRWC connection tuples in an attempt to free memory. It should be appreciated that the application 92 may maintain a corresponding reservation table. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of establishing a short-range wireless communications connection between a host device and a client device, wherein the host device includes a host certificate and a host key, the method comprising the steps of:

- transmitting an advertisement using a short-range wireless communications (SRWC) protocol from the host device to the client device, wherein the host device is a vehicle that includes a body control module (BCM), and wherein the BCM includes a root certificate store that includes the host certificate;
- receiving a connection request message from the client device;
- receiving a client device verification message, wherein the client device verification message includes an encrypted client certificate, wherein the encrypted client certificate is a certificate that is encrypted using a client key, and wherein the host key and the client key are part of a common encryption scheme;
- decrypting the encrypted certificate using the host key to obtain the client certificate;
- verifying the client certificate using the host certificate;
- generating a shared secret;
- encrypting the shared secret using the host key; and
- sending the encrypted shared secret to the client device.

2. The method of claim 1, wherein the root certificate store is used by the vehicle to carry out the verifying step.

3. A method of establishing a short-range wireless communications connection between a vehicle and a mobile device, wherein the vehicle includes a wireless communications device, wherein the wireless communications device comprises a short-range wireless communications (SRWC) circuit that is used to carry out wireless communications via a SRWC protocol, wherein the vehicle includes a secure vehicle system module (VSM) that stores a host key and a host certificate, and wherein the method comprises the steps of:

- transmitting an advertisement using the SRWC protocol, wherein the SRWC protocol is a Bluetooth™ protocol, and wherein the advertisement includes information pertaining to the services that are offered by the vehicle via the Bluetooth™ protocol;
- receiving a connection request message from the mobile device via the Bluetooth™ protocol;
- in response to receiving the connection request message from the mobile device, operating the wireless communications device in a listening mode;
- while the wireless communications device is operating in the listening mode, receiving one or more mobile device verification messages, wherein at least one of the one or more mobile device verification messages include at least part of an encrypted client certificate, wherein the encrypted client certificate is a certificate that is encrypted using a client key, wherein the host key and the client key are part of a common encryption scheme;
- decrypting the encrypted certificate using the host key to obtain the client certificate;
- after decrypting the encrypted certificate, verifying the client certificate using the host certificate, wherein the vehicle includes a body control module (BCM), wherein the BCM includes a root certificate store, and wherein the root certificate store is used by the vehicle to carry out the verifying step;
- in response to successfully verifying the client certificate, generating a shared secret;
- after generating the shared secret, encrypting the shared secret using the host key;
- after encrypting the shared secret, sending the encrypted shared secret to the mobile device;
- receiving a vehicle command request message from the mobile device, wherein the vehicle command request message includes a request to carry out a vehicle function; and
- carrying out the vehicle function using the vehicle.

4. The method of claim 3, further comprising the step of receiving a challenge response message from the mobile device using the established SRWC connection.

5. The method of claim 4, further comprising the steps of:

- in response to receiving the challenge response message from the mobile device, verifying the challenge response message using the BCM; and
- when the challenge response message is successfully verified, carrying out the vehicle function.

6. The method of claim 5, further comprising the step of, when the challenge response message is unsuccessfully verified, terminating the established SRWC connection.

* * * * *